(12) United States Patent
Tu et al.

(10) Patent No.: US 7,610,176 B2
(45) Date of Patent: Oct. 27, 2009

(54) TECHNIQUE FOR COLLECTING INFORMATION ABOUT COMPUTING DEVICES

(75) Inventors: Jerome Tu, Saratoga, CA (US); James Kim, San Jose, CA (US); Bennett Chan, Saratoga, CA (US); Jason Jianxiong Shi, Pleasanton, CA (US)

(73) Assignee: Palm, Inc., Sunnyvale, CA (US)

( * ) Notice: Subject to any disclaimer, the term of this patent is extended or adjusted under 35 U.S.C. 154(b) by 187 days.

(21) Appl. No.: 11/422,399

(22) Filed: Jun. 6, 2006

(65) Prior Publication Data

US 2007/0282999 A1    Dec. 6, 2007

(51) Int. Cl.
*G06F 17/40* (2006.01)
*G06F 19/00* (2006.01)

(52) U.S. Cl. .................. 702/187; 702/1; 702/33; 702/34; 702/127; 702/182

(58) Field of Classification Search .......... 702/1, 702/33, 34, 35, 127, 182, 183, 186, 187, 702/188; 709/213, 214
See application file for complete search history.

(56) References Cited

U.S. PATENT DOCUMENTS

| | | | | |
|---|---|---|---|---|
| 2,883,255 A | * | 4/1959 | Anderson | 346/34 |
| 3,792,445 A | * | 2/1974 | Bucks et al. | 360/6 |
| 4,258,430 A | * | 3/1981 | Tyburski | 714/1 |
| 4,644,368 A | * | 2/1987 | Mutz | 346/33 D |
| 5,068,787 A | * | 11/1991 | Pipella et al. | 705/32 |
| 5,218,543 A | * | 6/1993 | Komatsu | 701/35 |
| 5,800,460 A | * | 9/1998 | Powers et al. | 607/5 |
| 5,879,374 A | * | 3/1999 | Powers et al. | 607/5 |
| 6,976,111 B1 | * | 12/2005 | Mills et al. | 710/301 |
| 7,010,651 B2 | * | 3/2006 | McGuffin | 711/156 |
| 7,373,501 B2 | * | 5/2008 | Arima et al. | 713/150 |
| 2004/0059865 A1 | * | 3/2004 | McGuffin | 711/100 |
| 2004/0165314 A1 | * | 8/2004 | Fujiwara et al. | 360/133 |
| 2005/0210161 A1 | * | 9/2005 | Guignard et al. | 710/15 |
| 2006/0063520 A1 | * | 3/2006 | Fratti et al. | 455/423 |
| 2008/0005554 A1 | * | 1/2008 | Arima et al. | 713/150 |
| 2008/0133032 A1 | * | 6/2008 | Arima et al. | 700/79 |

FOREIGN PATENT DOCUMENTS

GB    2 302 179 A  *  1/1997
JP    5-40670 A  *  2/1993

* cited by examiner

*Primary Examiner*—Edward R Cosimano
(74) *Attorney, Agent, or Firm*—Mahamedi Paradice Kreisman LLP

(57) ABSTRACT

A computing device is provided on which device analysis information is generated. The device analysis information may be generated from the use of diagnostic and monitoring applications and code. The device analysis information is handled by an application/central processor and then stored on a removeable storage device.

27 Claims, 4 Drawing Sheets

TECHNIQUE FOR COLLECTING INFORMATION ABOUT COMPUTING DEVICES

TECHNICAL FIELD

The disclosed embodiments relate generally to a technique for collecting information about computing device. In particular, embodiments described herein relate to collecting information for use in evaluating and analyzing a computing device that is under test.

BACKGROUND

The design and implementation of a computing device has several phases, including phases where the device is put under test by test users (sometimes called "beta" users). The number of test users can range from just one to thousands. Test users enable different kinds of information to be determined, such as how the device will behave in a particular environment, and what components are likely to conflict or fail on the computing device when the device is put out for use by the general public.

Over the years, devices have become more complex and carry more functionality. For example, devices that provide cellular telephony operations now typically carry numerous applications, such as personal information management applications and/or camera functionality. With increasing complexity and functionality, the design and implementation of such devices has become more difficult. For example, there are increasingly more applications that can conflict, and more components that can fail.

To better understand newly designed devices, various types of information is recorded for a computing device during its testing phase. For example, diagnosis and logging information is recorded of failures, events, messages and device environment. This information is subsequently analyzed to debug and improve the device. Normally, to record such information, hardware modifications are made to the device. One typical modification is the addition of an external flex connector that is hardwired to the device in order to enable connectivity with a laptop that runs diagnostic software. These hardware modification limit the test user in ability to record information and/or use the device.

Furthermore, the difficulty in establishing a medium by which such information can be recorded often requires users who are technically knowledgeable to be involved in a testing of a computing device. For example, the everyday user cannot be expected to hardwire a flex connector to the external connector of the device under test, not can the everyday user operate a laptop or other device to collect information generated from the test use of the device. Such limitations reduces the universe of potential testers for a computing device.

DETAILED DESCRIPTION

Figure 1:
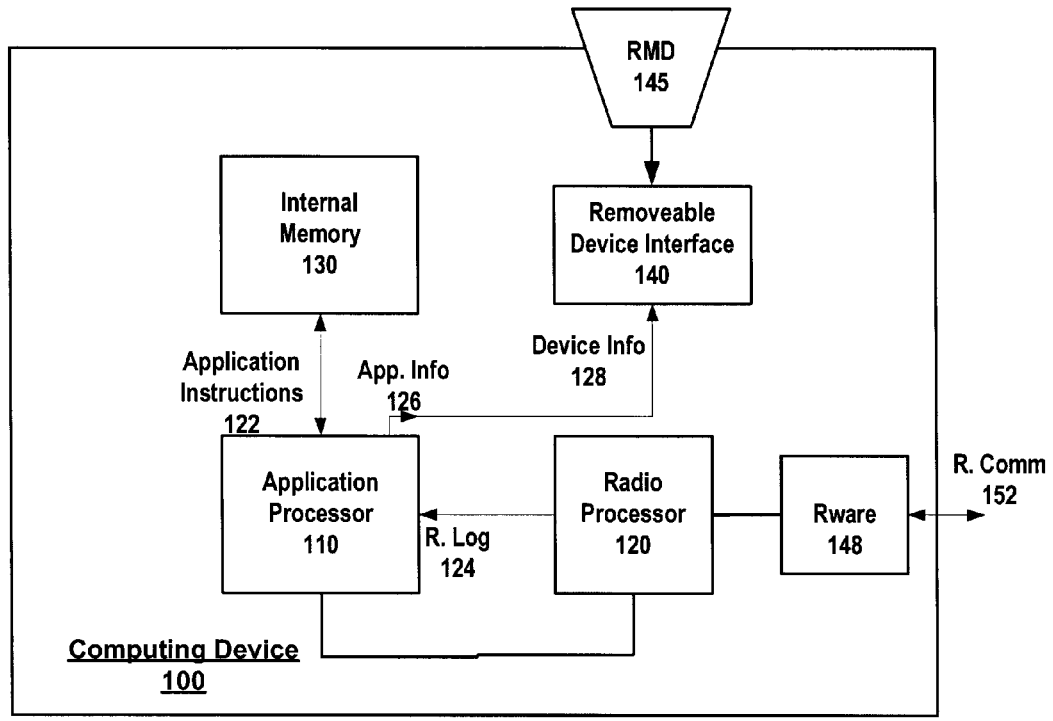
FIG. 1 is a simplified hardware diagram of a computing device that is configured to store device analysis information, according to one or more embodiments of the invention.

Embodiments described herein include a device, system and method that enables device analysis information to be collected from a computing device and stored on a removeable storage device. Once collected, the device analysis information may be used to evaluate and analyze the computing device, including its components, processes and operations. The use of a removeable storage device enables the device analysis information to be easily collected and used. Furthermore, by using a removeable storage device, the need for making hardware modifications to the computing device in order to retrieve device analysis information is reduced or eliminated.

In an embodiment, a computing device is provided on which device analysis information is generated. The device analysis information may be generated from the use of diagnostic and monitoring applications and code. The device analysis information is handled by an application/central processor and then stored on a removeable storage device.

As used herein, the term removeable storage device means any device that is designed to be mated and unmated to a computing device to provide memory for storing data. A removeable storage device has a primary function of storing data, and thus has no internal processing resources, but rather enables data storage and retrieval for computing devices that it are mated with it. Examples of a removeable storage device includes a memory card, such as a Secure Digital (SD) card or Compact Flash card.

The term "device analysis information" or "analysis information" includes information collected about the device, or its components (software, hardware or firmware), processes or operations. The device analysis information may have use to analyze, evaluate and record the processes and operations of the computing device, including operations of software components, hardware components (e.g. cellular radio components), subsystems of the device, and the device as a whole. Device analysis information may originate from a sub-system (such as cellular telephone radio firmware logs), a sub-process (such as TCP/IP stack), a system central processing unit, or other sources. Under some implementations, the device analysis information may reflect whether processes were performed correctly or disrupted, how external or programmatic events were handled, whether there was the occurrence of any error events, the speed in which the processes or operations were performed at, and information about the environment of the device or pertinent component(s) during the performance of the process or operation. Examples of the type of information that is collected include event logs, run-time reports, and data about the device's operational environment, although numerous other information may be collected. According to an embodiment, at least some device analysis information is generated from one or more processors that execute on the computing device, and this information reflects information about processes or operations executed by the processors, as well as information obtained from components on the device that are controlled or used by the processors. Throughout this disclosure, numerous examples and descriptions of device analysis information are provided to illustrate implementation and use of one or more embodiments.

One embodiment provides a mobile computing device that includes an interface for receiving a removeable storage device. The computing device may include a radio processor and/or subsystem that enables wireless, radio-frequency communications, such as with cellular networks or short range wireless networks (e.g. Wireless Fidelity and Bluetooth). In one embodiment, the radio processor is configured to execute instructions to generate radio analysis information about at least one of (i) processes performed by the radio processor, and (ii) components used or monitored by the radio processor. The computing device may further include a central processor that is configured to receive the radio analysis information from the radio processor, and execute instructions to generate analysis information about at least one of (i) processes performed by the central processor, and (ii) components used or monitored by the central processor. The central processor may store the analysis information on a removeable storage device that is mated with the interface.

According to one embodiment, the device analysis information is recorded in the background, and a processor of the device streams the information into a database stored on a removable storage card such as SD card (or other removeable storage device) being held by the computing device.

According to an embodiment, the central processor formats the information stored on the removeable storage device. In one embodiment, the formatting includes merging radio analysis information and analysis information generated from the central processor into one file, document or view. In another embodiment, the analysis information and analysis information generated from the central processor are provided in chronology, such as through use of time stamps or other information indicating when events corresponding to the information occurred.

In one embodiment, information about the performance of operations and processes is received and/or generated from a processor on a computing device. This information is then stored on a removeable storage device that is coupled to the computing device. When evaluation, diagnosis and/or analysis of the computing device is to be performed, the memory device may be removed or decoupled from the computing device and carried to another machine or device interface, where the device analysis information is transferred or used.

One or more embodiments described herein may be implemented on a device under test or evaluation. Devices under test or evaluation may correspond to device models that are under beta or pre-commercialized use. However, it is also possible for embodiments to apply to a commercialized device. For example, one or more embodiments may be applied to a device that has been sold to a consumer, and the consumer is operating the device to collect device analysis information for a manufacturer, developer or vendor of the device. Such an embodiment enables the device to be evaluated and analyzed for debugging purposes, where the consumer's use provides a realistic environment where a bug or reoccurring flaw is occurring. This allows a debugging process to at least be initiated while the device is still with the consumer, thus reducing cost and enabling the manufacturer (or party providing debugging service) to collect realistic information to service the product.

Accordingly, a test phase may correspond to a phase where a device, either as a class (e.g. newly introduced model) or as an individual device, is programmatically monitored for purpose of evaluating, debugging, and analyzing the device.

Under an embodiment, the device analysis information is collected on a flat card device or memory component. According to an embodiment, the device analysis information may be recorded on a Secure Digital card or other removeable device. The user of the device under test can then transfer the device analysis information by simply removing or transferring the card device.

One or more embodiments are provided for use with portable computing devices. Portable computing devices include mobile computing devices with radio-frequency communication capabilities, such as cellular phone and messaging devices, or hybrid/multifunction devices that have cellular communication capabilities. Other examples of portable computing devices include personal digital assistants, laptop computers, and small-form factor computing devices that can act as media playback devices, global positioning system (GPS) devices, and fully functioning computers.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

DEVICE DESCRIPTION

FIG. 1 is a simplified hardware diagram of a computing device that is configured to store device analysis information, according to one or more embodiments of the invention. A computing device 100 of FIG. 1 is assumed to have cellular-radio functionality combined with an application processor. A standard architecture for use with such devices is to include an application processor 110 and a radio processor 120, although other architecture and types of devices are also contemplated by embodiments described herein. Accordingly, device 100 includes internal memory 130 for holding programming code, files, data items and other data. For example, the internal memory 130 may hold the operating system of the computing device, as well as applications (e.g. core applications, accessory applications), files, and data items.

The radio processor 120 handles radio-frequency communications 152 on the computing device 100, including executing operations to transmit and receive radio-frequency communications (e.g. cellular) using radio hardware components 148 on the device 100. The radio processor 120 and the radio hardware component 148 may form a subsystem on the computing device 100. Examples of the types of data that can be transmitted or received on the radio subsystem include text data, media data, or voice data. The application processor 110, on the other hand, may run applications and manages databases and data.

The computing device 100 further includes a removeable memory interface 140 for receiving a removeable storage device 145. The removeable memory interface 140 may be contained in a slot, recess formation or other housing feature of the computing device 100, so that the removeable storage device 145 is held at least partially within the confines or boundary of the computing device 100. The removeable memory interfaces 140 enables communications between the removeable storage device and the application processor 120. In one embodiment, the removeable storage device 145 is in the form of Flash memory. For example, the removeable storage device may correspond to a Secure Digital card.

The computing device 100 may be configured in a manner shown with FIG. 1 when the device is deployed in a testing or evaluation phase. For example, during a "beta" testing phase (prior to consumer production), newly designed devices may be configured to execute monitoring programs and code that record program logs, events, and other device analysis information. The removeable storage device 145 may be connected to the interface 140, where the device analysis information is stored. From the removeable storage device 145, the device analysis information may be transferred to another computer, where it is used to analyze the computing device 100. The analysis may take the form of, for example, evaluating the operations and performance of the computing device 100, debugging and trouble shooting, performing diagnostics, and analyzing components (hardware and software) of the device.

The application processor 110 may communicate with and control the removeable storage device 145 when the device is inserted into the memory interface 140. As such, one embodiment provides that the application processor 110 writes the device analysis information to the removeable storage device 145. The device analysis information that is provided on the removeable storage device may be derived from data generated on the application processor 110, the radio processor 120, or provided from another component on the computing device. As illustrated by an embodiment of FIG. 3A-3C, an embodiment provides that the application processor 110 (or radio processor 120) may also, or alternatively, communicate the device analysis information to another computing device. For example, a peripheral connection port may be used to connect a laptop computer as a substitute or addition to the removeable storage device 145.

In an embodiment, the computing device 100 is assumed to be in a testing or diagnostic phase. As such, programmatic elements may exist on the computing device 100 that execute to observe or monitor the operations of various processes and components. In an embodiment, each of the application processor 110 and the radio processor 120 execute such analysis instructions 122 (e.g. diagnostic programs) and components to generate device analysis information. Under one embodiment, the radio processor 120 generates radio analysis information 124 ("radio log"), which is sent to the application processor 1 10. The radio analysis information 124 may include data that reflects operations of the radio hardware 148, programmatic elements executed by the radio processor 120, environmental conditions recorded by the subsystem, and events that are detected and handled by the radio processor 120. In one embodiment, the application processor 110 also generates application analysis information 126 internally.

Figure 2:
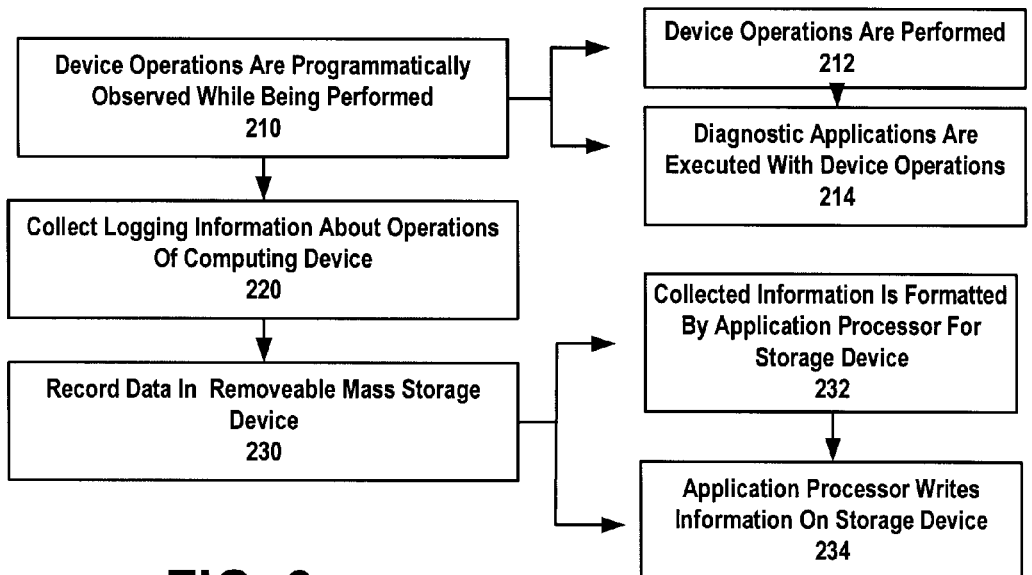
FIG. 2 illustrates a method in which device analysis information may be collected, under an embodiment of the invention.

As described with, for example, an embodiment of FIG. 2, application processor 110 stores monitored device data 128, corresponding to the radio and application analysis information 124, 126 respectively. An embodiment such as shown illustrates the application processor 110 stores the monitored device data 128 on the on the removeable storage device 145, when the device is coupled to the application processor 110 via the device interface 140. The application processor 110 may format device analysis information for storage with the removeable storage device 145. For example, the application processor 110 may create a document that contains the radio and application analysis information 124, 126 in File Application Transfer format.

Under another implementation, the analysis instructions may generate the device analysis information to be in, for example, text or binary. In either case, one embodiment provides that the application processor 110 may format the device analysis information by performing presentation instructions to make the information more readable. For example, binary device analysis information may be converted to text data, and text based device analysis information may be provided context and ancillary information such as a time stamp. As further described, the application processor 110 may also perform operations for performing at least some of the analysis or evaluation (e.g. "debugging") using the collected device analysis information.

During a testing phase, the device may store on the removeable storage device 145 various kinds of data that enable analysis of the device, including the device's components, software and overall performance. In order for the device analysis information to be used, one embodiment provides that the storage device 145 is removed or decoupled from the interface 140 and transferred to another computing device, where the device analysis information is transferred and/or used.

METHODOLOGY

FIG. 2 illustrates a method in which device analysis information may be collected, under an embodiment of the invention. A method such as described may be implemented using, for example, a system such as described with FIG. 1. Accordingly, any reference to element of other embodiments or figures is intended to illustrate only suitable elements for performing a step, sub-step or stated function.

In step 210, operations of a device under test are programmatically observed. In one embodiment, certain device operations of interest are performed in a sub-step 212. Operations of interest may those that are monitored. Typical examples include radio operations, such as communicating between the device and a cellular network, receiving incoming calls, sending out calls or receiving/sending other messages communications. Concurrently, sub-step 214 provides that diagnostic and analysis applications are executed with device operations. For example, a device under test (e.g. a "beta" device) may be equipped with one or more diagnostic and/or analysis programs that execute in the background to monitor the device operations. Hardware components, firmware, software, and sub-systems may be monitored as selected.

Step 220 provides that analysis information is collected about the operations of the computing device. The analysis information may encompass information such as described elsewhere in this application. Other examples of analysis information include error messages, run-time errors and reports, environment information, and performance evaluation information.

In step 230, the analysis information is stored in a removeable storage device component that is interfaced with the computing device. For example, as described with FIG. 4, a card device 422 may be inserted within a slot 412 that is configured to receive the device. As a sub-step 232, device information is formatted by the application processor 110 of the computing device in order to have it stored and/or made more usable on the memory device. In one embodiment, for example, the application processor 110 (FIG. 1) formats the analysis information into one or more files that are structured as File Application Transfer (FAT) files. Once formatted, the application processor 110 stores the analysis information on the memory device. Other examples of formatting operations that can be performed include providing syntax for binary data or cryptic text data. Sub-step 234 provides that the application processor 110 stores the formatted device analysis information on the removeable storage device 145.

As an addition or alternative, the device analysis information that is stored by the application processor 110 includes data that is derived or based on raw data generated from the various analysis instructions 122 (e.g. diagnostic programs) that execute on the computing device 100. In one embodiment, the application processor 110 performs additional operations when storing the analysis information. These operations may include operations for presenting and making the device analysis more readily available for use. An embodiment such as shown with FIG. 5, for example, illustrates operations that can be performed to combine device analysis information from two or more sources (e.g. application processor 110 and radio processor 120), and to place that information in a chronological presentation. Such an implementation would allows, for example, more simple analysis that can relate events to operations performed by more than one component.

In another embodiment, some diagnostic or analysis operations may be performed on the device analysis information before that information is stored on the removeable storage device 145. For example, application processor 110 may perform preliminary diagnostic operations to cull or aggregate the cumulated device analysis information. A detected flaw or event of interest may even be displayed or communicated to the user.

The embodiments and implementations described above illustrate that the device analysis information that is actually stored may be derived or be based on raw data generated from the execution of the applications that monitor the device. Alternatively, the device analysis information may correspond to just raw data provided by the various monitoring resources, or the raw data supplemented with information that is derived, formatted or processed from the raw data. In either case, the information is stored on a medium (e.g. memory card) that can readily be transferred without making any hardware modifications to the device under test.

USE OF MULTIPLE INTERFACES TO TRANSFER ANALYSIS INFORMATION

Figure 3A:
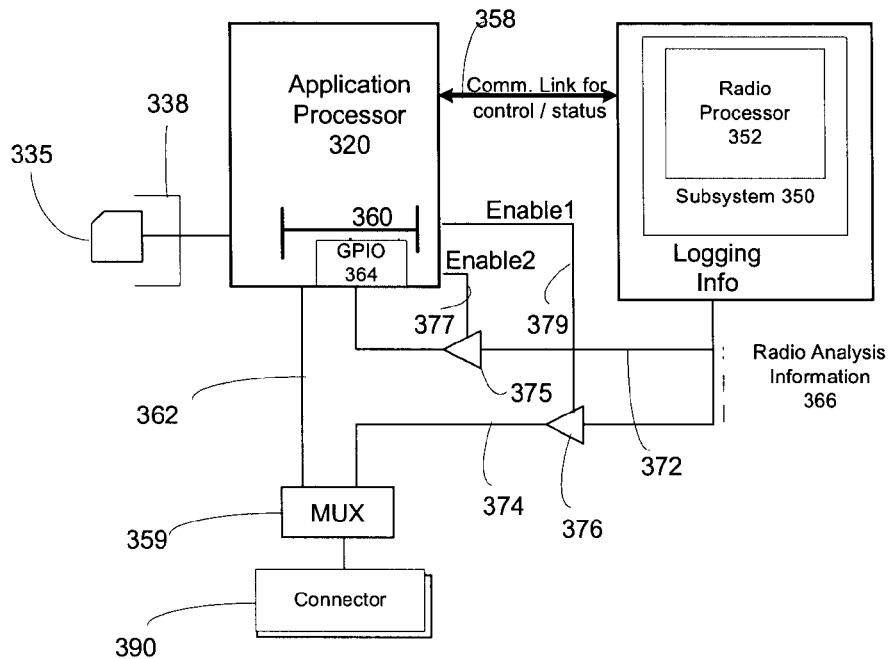
FIG. 3A-3C illustrate a system for capturing device analysis information on a computing device using multiple interfaces, according to an embodiment of the invention.
Figure 3C:
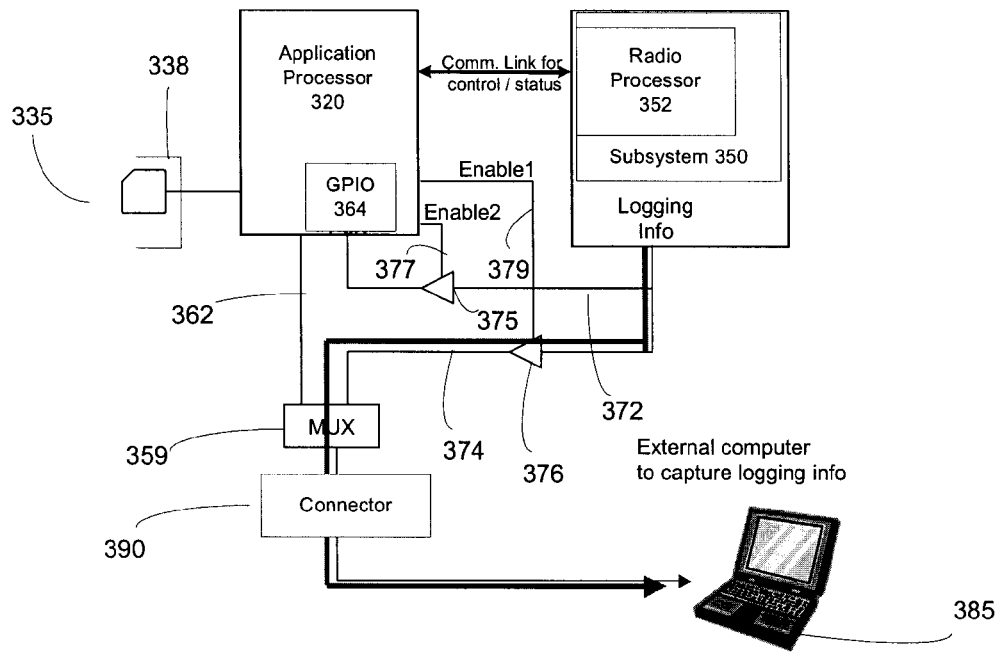
Figure 3B:
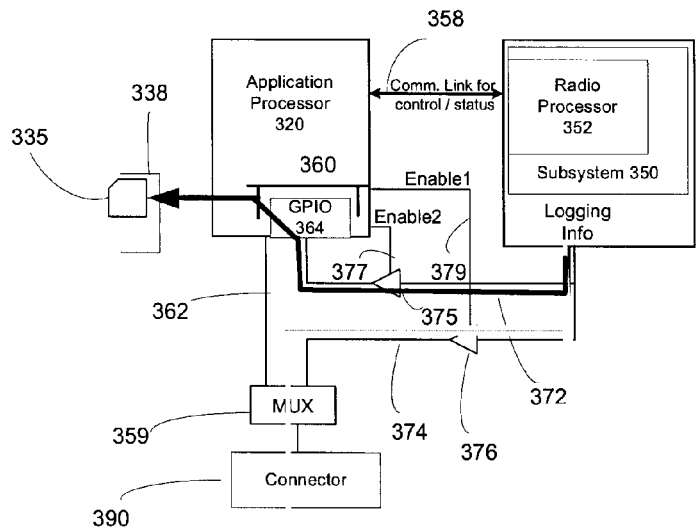

FIG. 3A-3C illustrate a system for capturing device analysis information on a computing device using multiple interfaces, according to an embodiment of the invention. In particular, an embodiment of FIG. 3A-FIG. 3C provides for a computing device that can dynamically switch from transmitting the device analysis information between a connected or peripherally attached computer 385 (see FIG. 3B) and a removeable storage device 335.

In FIG. 3A, the computing device includes a central processor 320 and a cellular radio subsystem 350. The central processor 320 may control operations of numerous applications, components, and processes. To this end, the central processor 320 may have similarities or equivalence to an application processor, such as described with an embodiment of FIG. 1. The cellular radio subsystem 350 may include components and logic for enabling wireless radio operations, including cellular telephony and messaging. In one implementation, a radio processor 352 provides at least some of the logic for enabling the wireless radio operations. When in operation, the central processor 320 and cellular radio subsystem 350 communicate to, for example, enable telephony and messaging applications to use functionality and data provided by the cellular radio subsystem. A data link 358, such as a data bus, may extend between the central processor 320 and cellular radio subsystem 350 to provide passage of control and status communications as well other communications.

According to an embodiment, the computing device includes a removeable device interface 338 that can receive devices of a particular form factor. In one embodiment, the device interface 338 is in the form of a slot that can receive and communicate with card devices. Such card devices may conform to a standard body or proprietary form factor and design, such as the Secure Digital standard used by many common mass storage devices. To this end, device interface 338 may be in the form of a slot that retains at least a portion of the card device. For example, a housing of the computing device may include a slot on which a connective interface is provided for receiving an SD Card.

The central processor 320 may communicate and control the removeable storage device 335 when it is mated with memory device interface 338. The computing device may also include a connector port 360 to enable peripheral communications with other computing device. Under one implementation, the connector port 360 terminates into a connector 390 that enables connectivity and communications with peripheral devices and/or other computing devices. For example, synchronization operations may be performed using a wireline connection that extends through the connector 390 and the connector port 360. But during a testing phase, FIG. 3C illustrates that a peripherally attached computer 385 may be connected to the computing device to record device analysis information, using the same connector port 360 that is used to provide peripheral connectivity. The connector port 360 includes a plurality of ports, including a serial lines 362 and a general purpose input/output port (GPIO) 364.

According to an embodiment, the computing device is configured such that the cellular radio subsystem 350 communicates radio analysis information 366 to the central processor 320. The configuration of the computing device may exist when the device is deployed during a testing or evaluation phase. Embodiments described herein simplify the process of collecting device analysis information, particularly in a large scale testing phase, so that fairly common or non-technical users can be used to collect device analysis information in more casual and realistic use. For example, such users may be able to use an SD card or other removeable storage device to run diagnostic tests and send collected device analysis information to the manufacturer, for purpose of debugging a device.

In an embodiment shown by FIG. 3A-3C, the computing device is configured to generate device analysis information, and to perform one or both of (i) storing the device analysis information on removeable storage device 335, and/or (ii)

sending the device analysis information to the peripherally attached computer 385. In an embodiment shown, the device analysis information is generated from the radio subsystem 350, and is referred to as radio analysis information 366. However, device analysis information may also be generated from or with other components, including the central processor 320. The central processor 320 may use the connector port 360 to transfer the radio analysis information 366 to the peripherally attached computer 385. Additionally, central processor 320 may use the removeable storage device interface 338 to store the radio analysis information 366 on the removeable storage device 335. As mentioned, by providing an option for using the removeable storage device 335, an embodiment enables the testing phase to be extended to users who do not have technical expertise with understanding how to use the connector port 360 to collect the information. Furthermore, the use of the computing device during the testing phase is made more mobile, as the need to have the peripherally attached computer 385 present in order to record the radio analysis information 366 is reduced or eliminated.

The computing device may be configured to record radio analysis information 366 from the cellular radio subsystem 350. In one embodiment, the central processor 320 receives the radio analysis information 366 in real-time, and stores the information with the removeable storage device. Alternatively, or in addition to use of the removeable storage device, either the central processor 320 or the radio processor 352 may route the radio analysis information 366 to the peripherally attached computer 385. This may also be done in real-time. This radio analysis information 366 may include, for example, subsystem messages, error indications, real-time logs of events and notifications, and information recorded from the radio-environment, such as strength of cellular network signal. The radio analysis information may also be time-stamped.

The processor 352 of the cellular radio subsystem 350 may output its radio device analysis information 366 on two different sets of signal lines, depending on whether the information is to be sent to the peripherally attached computer 385 or to the removeable storage device 335. In an embodiment such as shown by FIG. 3A-FIG. 3C, first set of signal lines 372 extend from the cellular radio subsystem 350 to the GPIO 364 of the central processor 320. The first set of signal lines 372 include a first buffer 375 with a first control enable input 377 that connects to a first enable port of the central processor 320. The second set of signal lines 374 extend from the cellular radio subsystem 350 to the connector 390. The second set of signal lines 374 also include a second buffer 376 having a second control enable input 379. The second control enable input 379 may couple to a second enable port of the central processor 320.

However, under one implementation, the connector 390 must accommodate the serial lines 362 of the central processor 320, while having a limited form-factor. In such an implementation, the second set of signal lines 374 cannot be run through the connector 390 without disabling the serial lines 362. To maximize functionality of the device under test, while eliminating or reducing hardware modifications, one embodiment provides for use of a multiplexer 359 that acts as a switching element between the serial lines 362 and the second set of signal lines 374 that extend from the processor 352. In this way, the multiplexer 359 serves as a switch element that can enable the second set of signal lines 374 and the serial lines 362 to both use the connector 390.

Alternatively, the functionality provided with the multiplexer 359 may be simulated with programming and logic. The application processor 320 may be configured so as to not drive signal lines 362 either high or low, but rather keep the signal lines 362 inactive or neutral. Likewise, buffer 376 may be switched the enable input 379 so that signal lines 374 are switched between a neutral and driven state. In this way, multiplexer 359 may be simulated by using logic of application processor 320 to make signal lines 362 neutral, while signal lines 374 are driven; or by driving signal lines 362, while using the enable input 379 to make signal lines 374 neutral. Numerous variations to tri-stating signal lines as described are also contemplated.

FIG. 3B illustrates the case where radio analysis information 366 is passed from the radio processor 352 of the cellular subsystem 350 to the central processor 320 and on to the removeable storage device 335. Under one embodiment, the central processor 320 sends a signal to disable the second buffer 376 and enable the first buffer 375. The GPIO 364 is configured for input, and the radio analysis information 366 is passed to the central processor 320 via the GPIO 364. The central processor 320 stores the radio device analysis information 366, or alternatively, information and data that is derived or based on the radio device analysis information, in the removeable storage device 335 via the interface 338.

FIG. 3C illustrates the case where radio analysis information 366 is passed from the processor 352 of the cellular subsystem 350 to the peripheral computing device 385. In a configuration shown, the GPIO 364 is first configured as input, so that there is no conflict with the output being provided from the second set of signal lines 374. The first buffer 375 may be disabled, and the second buffer 376 enabled. This allows the radio analysis information 366 to be passed to the multiplexer 359, which has a state to enable connectivity between the second wet of signal lines 374 and the connector 390.

According to one implementation, the connector 390 can be used for purposes other than passing radio analysis information 366. Such an embodiment may provide that the following configurations may take place: (i) GPIO 364 is configured as output, (ii) the first and second buffers 375, 376 respectively are disabled, (iii) the multiplexer 359 is aligned to establish connectivity with the serial lines 362 of the central processor 320.

Figure 4:
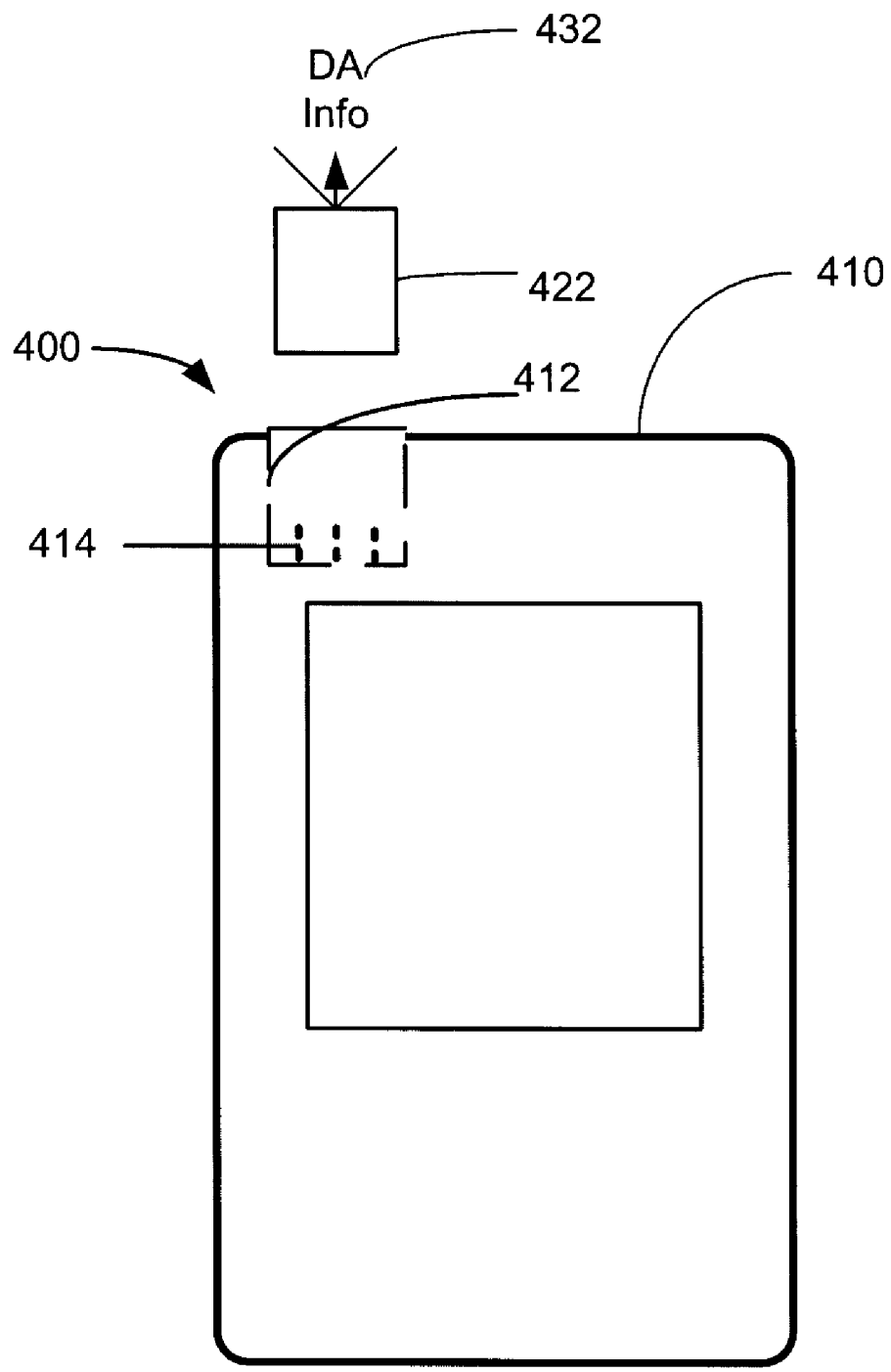
FIG. 4 is a diagram illustrating how a computing device is used, according to one or more embodiments described herein.

FIG. 4 is a diagram illustrating how a computing device is used, according to one or more embodiments described herein. A computing device 400 may correspond to a mobile computing device, such as a device that has cellular telephony functionality, as well as additional functionality such as messaging (e.g. wireless email or text messaging), media playback (audio and video), image capturing, and/or global positioning system functionality. The computing device 400 includes a housing 410 on which a slot 412. The slot 412 provides the interface for a removeable storage device 422, which is insertable in slot 412. As such, slot 412 is configured to receive one or more different kinds of removeable memory card devices. Each kind of peripheral card device may correspond to a particular standard or proprietary design. In one embodiment, a removeable card device 422 can be inserted into the slot 412. When inserted, connector elements 414 within the slot 412 mate with connector elements of the card device 422 to establish connectivity. Connectivity enables a central processor (e.g. application processor 110 of FIG. 1) store and retrieve data from the removeable storage device 422. As shown with FIG. 1 and FIG. 3A-FIG. 3C, an application processor or central processor may communicate and control data that is provided or read from the card device 422.

In one embodiment, the removeable storage device 422 is a memory-only device, meaning the device's function is solely to provide memory. When inserted into slot 412, a substantial length of the removeable storage device 422 resides within the housing 410 of the computing device. The removeable storage device 422 may be removeable, in that it is designed to be inserted and withdrawn from the housing 410.

In order to implement one or more embodiments, a user may insert the removeable storage device 422 into the slot 412. One or more programs may execute internally within the device to collect analysis information, including information such as how the device performs, the occurrence of designated events (e.g. device failures or incoming phone calls), the environment of the device (e.g. strength of signal from cellular network), the operation of components within the computing device, log information from processors and radio hardware and other components, and the overall performance of the computing device 400. The collection of the analysis information may be automatic, or substantially automatic, and/or responsive to actions such as the device being operated. Additionally, the collection of analysis information may be performed as a background process.

In order to implement one or more embodiments, the user of the device 400 under test may insert the removeable storage device 422 and operate the device in a manner that generates analysis information. This may correspond to normal use, simulated normal use, or the user may perform designated actions that are monitored. When sufficient device analysis information 432 is stored on the removeable storage device 422, the device is removed from slot 412 and transferred to another device where the data is copied or otherwise analyzed.

DATA ANALYSIS PRESENTATION

In addition to collecting and storing analysis information, one or more embodiments contemplate that a processor of the computing device performs operations for aiding the presentation and/or use of the presentation information. With reference to FIG. 1, for example, an embodiment provides that application processor 110 receives device analysis information from the radio processor 120, and also generates its own device analysis information. Rather than transfer the device analysis information from both sources to the removeable storage device in an unprocessed form, the application processor 110 may perform operations on the combined information so that the device analysis information is stored in a processed form on the removeable device.

Figure 5:
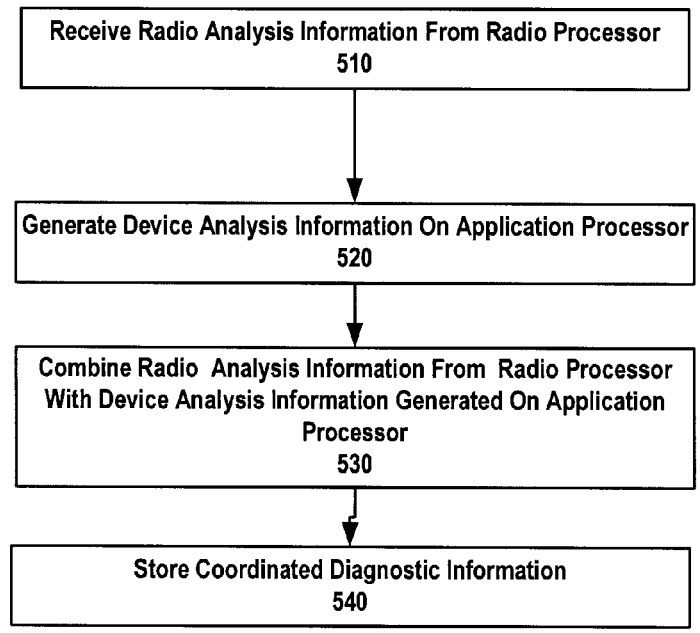
FIG. 5 illustrates an embodiment in which an application (or central) processor performs operations to present and format device analysis information from multiple sources, under an embodiment of the invention.

FIG. 5 illustrates an embodiment in which an application (or central) processor performs operations to present and format device analysis information from multiple sources, under an embodiment of the invention. In describing a method of FIG. 5, reference may be made to elements of FIG. 1 for purpose of illustrating suitable components for performing a step, sub-step or operation.

In step 510, the application (or alternatively the central) processor 110 retrieves radio analysis information 366 (FIG. 3A-FIG. 3C) from the radio processor 120. Step 520 provides that concurrently, the application processor 110 generates its own device analysis information. Thus, the application processor 110 processes or receives device analysis information from two sources.

In step 530, the application processor processes the device analysis information by combining the device analysis information from the radio processor 120 and the application processor. In one embodiment, the result of the combination may be one document or view that contains events, logs, and other device analysis information from both sources, in a chronological order. For example, device analysis information from each source may be listed along a timeline. Other operations may also be performed on the device analysis information. For example, insignificant or redundant information may be filtered out before the information is stored on the removeable storage device. To further the example, significant events and logs, such as failures, conflicts between components and environmental information may be listed in some form of chronological fashion, so that even a visual scan can enable a person doing analysis to see, for example, how one event in time affected components of the different processors.

In step 540, the processed device analysis information is stored on the removeable storage device in a coordinated and chronological fashion. As described, the device can then be removed so that the coordinated data from the two sources can be analyzed, both programmatically, or visually. One or more embodiments also contemplate the device on which the analysis information is stored to also be a source for performing subsequent analysis. Since the data is securely stored and easily accessible, one embodiment provides that the analysis operations or evaluation may be initiated on the actual device under test.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for collecting information for use in performing analysis about one or more operations of a computing device in a pre-commercialized state, the method comprising:
   generating device analysis information about one or more processes performed to identify performance characteristics and process errors of the computing device in the pre-commercialized state, wherein the device analysis information is generated at least in part, by a processor on the computing device;
   responsive to generating the device analysis information, storing data that is based on or corresponds to the device analysis information, on a removeable storage device that is under a control of the processor of the computing device;
   enabling data communicated on the removeable storage device to be communicated to a manufacturer for evaluation in commercializing the computing device.

2. The method of claim 1, wherein generating the device analysis information includes generating diagnostic information about how the one or more processes were performed, and wherein storing data that is based on or corresponds to the device analysis information is performed in real-time from when the device analysis information was generated.

3. The method of claim 1, wherein storing data that is based on or corresponds to the device analysis information includes capturing the device analysis data on a storage device that is held internal to the computing device.

4. The method of claim 1, wherein storing data that is based on or corresponds to the device analysis information includes capturing the data on a memory-only device.

5. The method of claim 1, wherein storing data that is based on or corresponds to the device analysis information includes capturing the data on a secure digital card device.

6. The method of claim 1, wherein storing data that is based on or corresponds to the device analysis information includes formatting the device analysis information into a file within the computing device.

7. The method of claim 1, wherein storing data that is based on or corresponds to the device analysis information includes formatting the device analysis information into a File Application Transfer file format within the computing device.

8. The method of claim 1, wherein generating device analysis information about one or more processes performed on the computing device includes generating device analysis information from a radio processor that performs processes for enabling radio-frequency communications.

9. The method of claim 1, wherein generating device analysis information about one or more processes performed on the computing device includes generating device analysis information from an application processor.

10. The method of claim 1, wherein generating device analysis information about one or more processes performed on the computing device includes generating device analysis information from both a radio processor and an application processor.

11. A mobile computing device comprising:
an interface for receiving a removeable storage device; and
a processor that is configured to:
receive or generate device analysis information about, or relevant to, performance of one or more processes or components of the mobile computing device in a pre-commercialized state, while concurrently performing at least part of the one or more processes, wherein the device analysis information identifies performance characteristics and process errors of the processor or the mobile computing device;
store the device analysis information on a removeable storage device mated with the interface; and
format the device analysis information for use in evaluating the device in the pre-commercialized state.

12. The mobile computing device of claim 11, wherein the interface includes a slot that enables the removeable storage device to be received within a housing of the mobile computing device, and wherein the removeable storage device is a memory-only device.

13. The mobile computing device of claim 11, wherein the processor is configured to format the device analysis information when storing the device analysis information with the removeable storage device.

14. The mobile computing device of claim 11, wherein the processor is configured to perform one or more operations to (i) present the device analysis information, or (ii) evaluate the device analysis information that is stored on the removeable storage device.

15. The mobile computing device of claim 11, wherein the processor is configured to control the removeable storage device when the removeable storage device is mated with the interface.

16. The mobile computing device of claim 15, wherein the interface is configured to receive a Secure Digital memory card as the removeable storage device.

17. A mobile computing device comprising:
an interface for receiving a removeable storage device; and
a radio processor for enabling wireless, radio-frequency communications from the mobile computing device, wherein the radio processor is configured to execute instructions to generate radio analysis information about at least one of (i) processes performed by the radio processor, and (ii) components used or monitored by the radio processor; and
a central processor that is configured to:
receive the radio analysis information from the radio processor;
execute instructions to generate analysis information about the mobile computing device in the pre-commercialized state, the analysis information including information about at least one of (i) processes performed by the central processor, and (ii) components used or monitored by the central processor, wherein the device analysis information further identifies one or more performance characteristics or process errors of the mobile computing device in the pre-commercialized state; and
communicate (i) the radio analysis information received from the radio processor, and (ii) the analysis information generated on the central processor, to a removeable storage device mated with the interface.

18. The mobile computing device of claim 17, wherein the interface includes a slot that enables the removeable storage device to be received within a housing of the mobile computing device, and wherein the removeable storage device is a memory-only device.

19. The mobile computing device of claim 17, wherein the central processor is configured to format the radio analysis information and the analysis information generated on the central processor on the removeable storage device.

20. The mobile computing device of claim 17, wherein the central processor is configured to perform one or more operations to (i) present the radio analysis information or the analysis information, or (ii) evaluate the radio analysis information or the analysis information that is stored on the removeable storage device.

21. The mobile computing device of claim 17, further comprising:
a connector; and
wherein the radio processor is operable to send at least some of the radio analysis information to either (i) another device connected to the mobile computing device through the connector, or (ii) to the removeable storage device through the central processor.

22. The mobile computing device of claim 21, further comprising:
a switching element coupled to the connector and the central processor;
wherein when the radio processor sends the radio analysis information to the other device through the connector, either the central processor or the radio processor causes the a state of the switching element to switch so as to disable the central processor from using the connector.

23. The mobile computing device of claim 17, wherein the central processor is configured to control the removeable storage device when the removeable storage device is mated with the interface.

24. The mobile computing device of claim 23, wherein the interface is configured to receive a Secure Digital memory card as the removeable storage device.

25. A mobile computing device comprising:
an interface for receiving a removeable storage device; and a radio subsystem comprising one or more components for enabling wireless, radio-frequency communications from the mobile computing device;

a central processor that is configured to:

receive radio analysis information from the radio subsystem;

execute instructions to generate analysis information about the mobile computing device in the pre-commercialized state, the analysis information including information about at least one of (i) processes performed by the central processor, and (ii) components used or monitored by the central processor, wherein the device analysis information further identifies one or more performance characteristics or process errors of the mobile computing device in the pre-commercialized state; and communicate information comprising the radio analysis information received from the radio subsystem and the analysis information generated on the central processor, to a removeable storage device mated with the interface; and format the information stored on the removeable storage device.

26. The mobile computing device of claim 25, wherein the central processor is configured to format the information by combining the radio analysis information and the analysis information generated on the central processor on a single document or view.

27. The mobile computing device of claim 26, wherein the central processor is configured to format the information by presenting at least some of the radio analysis information and at least some of the analysis information in a chronological order.

* * * * *